| United States Patent [19] | [11] Patent Number: 4,848,778 |
| --- | --- |
| von Pragenau | [45] Date of Patent: Jul. 18, 1989 |

[54] TWIST SEAL FOR HIGH-PRESSURE VESSELS SUCH AS SPACE SHUTTLE ROCKET MOTORS

[75] Inventor: George L. von Pragenau, Huntsville, Ala.

[73] Assignee: The United States of America as represented by the Administrator of the National Aeronautics and Space Administration, Washington, D.C.

[21] Appl. No.: 279,603

[22] Filed: Dec. 5, 1988

[51] Int. Cl.$^4$ .......................... F16J 15/28; F16J 15/08
[52] U.S. Cl. ..................................... 277/236; 277/27; 277/165; 277/235 A
[58] Field of Search ..................... 277/3, 27, 165, 173, 277/235 R, 235 A, 236

[56] References Cited

U.S. PATENT DOCUMENTS

| 1,546,525 | 7/1925 | Wasson | 277/236 |
| 2,970,023 | 1/1961 | Thompson | 277/236 |
| 3,207,524 | 9/1965 | Tabovich | 277/236 X |
| 3,567,258 | 3/1971 | Scaramucci | 277/236 X |
| 4,477,093 | 10/1984 | Adamek | 277/236 X |

*Primary Examiner*—Robert S. Ward
*Attorney, Agent, or Firm*—William J. Sheehan; John R. Manning; Charles E. B. Glenn

[57] ABSTRACT

Seals for sealing clevis and flange joints (14) of a solid rocket booster motor, and more particularly to a seal (30) which is twisted upon application of expansion forces to an edge seal (36). This twisting motion initially causes a leading edge seal (44) to be urged into sealing engagement with a surface (48) of an adjacent member (20) and thereafter, increasing fluid pressure on a pressurized side (64) of a seal (30) drives a broad sealing region (46) into sealing engagement with a surface (48).

15 Claims, 3 Drawing Sheets

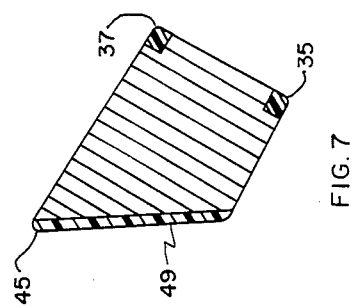
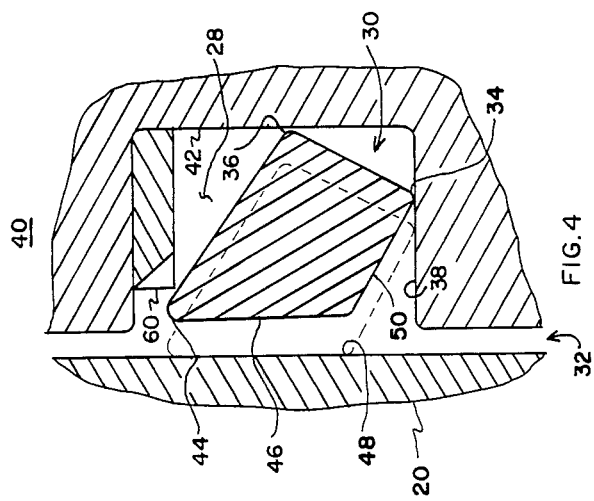
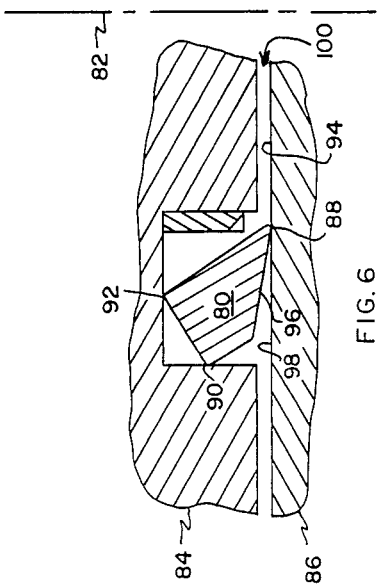
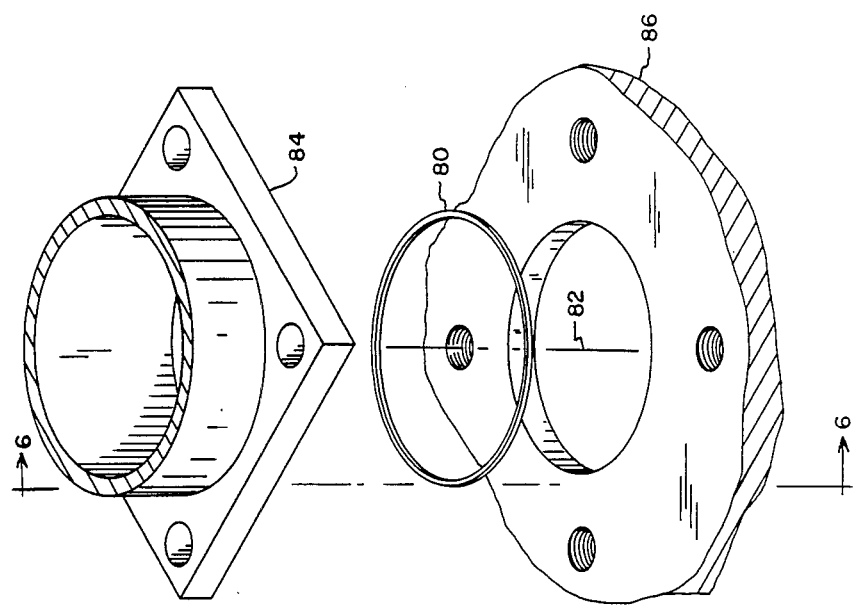

TWIST SEAL FOR HIGH-PRESSURE VESSELS SUCH AS SPACE SHUTTLE ROCKET MOTORS

ORIGIN OF THE INVENTION

The invention described herein was made by an employee of the U.S. Government and may be manufactured and used by or for the Government for Government purposes without the payment of any royalties thereon or therefor.

FIELD OF THE INVENTION

This invention relates generally to seals, and more particularly to a twist seal for sealing an interstitial region between solid rocket booster segments.

BACKGROUND OF THE INVENTION

Most solid rocket motors or boosters utilize O-rings in their construction and assembly, with large diameter O-rings sealing the segment clevis joints and nozzle flange against hot exhaust gases being most critical. In general, these joints are sealed by a combination of a pair of O-rings and heat-resistant putty over an interior region of the joints. O-rings used in these joints are constructed of an elastic, resilient material and are packed into grooves circumferentially located in the clevis joint and nozzle flange during booster assembly.

Primary concerns about these O-rings is their inability to maintain elasticity at depressed temperatures and a tendency to burn or deteriorate when exposed to hot exhaust gases. This was graphically illustrated on Jan. 28, 1986, when the Space Shuttle Challenger was destroyed as a result of an O-ring failure due to loss of elasticity brought on by unusually cold weather. Other disadvantages of O-rings include uncertain sealing under transient pressures upon ignition and the possibility of damaging the O-ring during stacking, or assembly, of the booster segments. Testing of the O-rings after the booster is assembled is limited to applying pressures to a point between the O-rings to observe the pressure at which the O-rings become unseated.

Accordingly, it is an object of this invention to provide a clevis joint and nozzle flange seal which is insensitive to a wide range of temperatures, consists of a solid metal ring that seals by twisting, and locks under pressure of booster ignition yet unlocks readily during disassembly. This seal is designed to be easily retrofitted to replace O-rings and to have an operating temperature range from the cryogenic to the very hot.

SUMMARY OF THE INVENTION

A generally circular seal for sealing an interstice between adjacent members and being positioned in a groove in one of the members, the seal being disposed to twist upon application of expansion forces and fluid pressure thereto. Initially, a leading sealing edge seals the interstice, after which a broad, sealing edge is forced by increasing fluid pressure into sealing engagement with the adjacent member. The groove is sealed against fluid pressure by a relatively narrow sealing edge which also serves as a pivotal edge about which the seal twists.

BRIEF DESCRIPTION OF THE DRAWINGS

FIG. 4 is an enlarged sectional view of a seal disposed for twisting and sealing upon booster ignition but is in a non-interfering configuration for ease of booster assembly.

FIG. 5 is an exploded pictorial view of a seal of the present invention adapted for use on a flange joint.

FIG. 6 is a partial sectional view taken along line 6—6 of FIG. 5.

FIG. 7 is a cross section of an alternate embodiment showing seal edges and seal surfaces constructed of deformable material.

DETAILED DESCRIPTION OF THE PREFERRED EMBODIMENT

Figure 1:
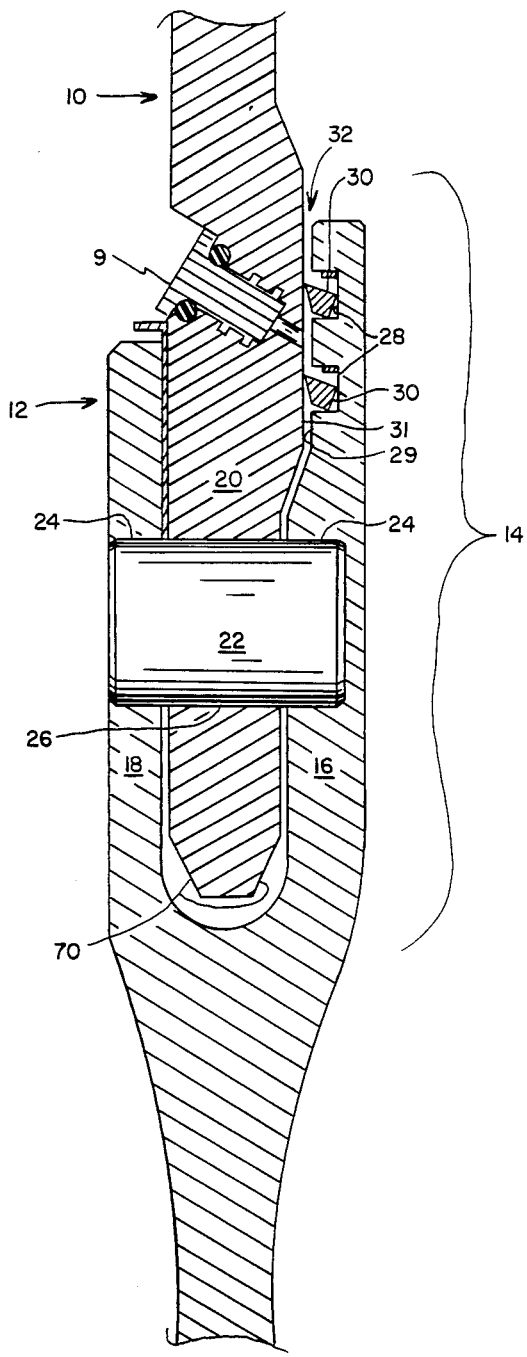
FIG. 1 illustrates a sectional view of a rocket motor clevis and tongue joint.

Referring to FIG. 1, portions of a pair of solid rocket booster motor segments 10 and 12 are shown coupled together by a clevis flange joint 14 extending therearound. This joint is subject to expansion upon booster ignition and relatively high pressure (approximately 1,000 PSI) until the solid fuel is spent. Joint 14 is constructed on lower segment 12 having inner and outer clevis sections 16 and 18, respectively, and on an upper segment 10 having a tongue 20 for fitting between sections 16 and 18. A series of pins 22 (only one shown) fitting through openings 24 in clevis sections 16 and 18 and opening 26 in tongue 20 securely holds booster sections 10 and 12 together. As these joints must be sealed against burning propellant gases, grooves 28 cut into the inner surface 29 of clevis section 16 are provided with annular seals 30 that twist upon expansion of joint 14, sealing an interstitial region 32 between inner clevis section 16 and the inner surface 31 of tongue 20 against excursions of hot gases. Seals 30 are generally constructed of metal, giving them an operating temperature range from cryogenic (−400° F.) to very hot (1,200° F.). However, in some instances, these seals may be constructed of carbon fiber reinforced material or a composition of selected materials depending on the application. Additionally, the seals may be coated with a heat resistant substance, such as asbestos, for further increasing the upper operational temperature range of the seals.

Figure 2:
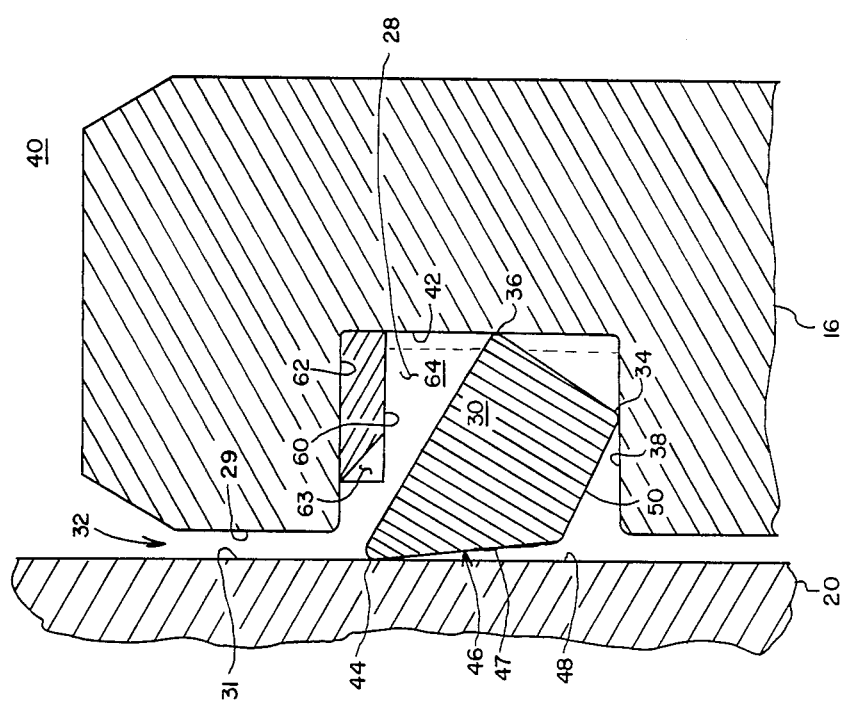
FIG. 2 illustrates an enlarged cross-sectional view of a groove and seal of the present invention shown in FIG. 1.

Referring now to FIG. 2, which is a cross-sectional enlarged view of the rocket motor joint and seals 30, it is seen that seals 30 are mounted in grooves 28 which include a surface 38 opposed from a source of pressure 40 in interstitial region 32 and a recessed groove wall 42 which expands outward when the booster is ignited. Seals 30 include edge sealing regions 34 and 36, which seal against groove walls 38 and 42, respectively, and a broad sealing surface 47, which seals against surface 31 of tongue 20. Sealing regions 34 and 36 are constructed having a narrow contact area with respect to broad sealing surface 47, allowing them to deform slightly under high pressure generated by the burning fuel and seal local irregularities in wall 38 of groove 28. An upper, sealing, leading edge region 44 of the seal (with respect to pressurized interstitial region 32 of the motor) is continuous with broad sealing region 46, with this broad seal region facing an inner surface 48 of tongue 20. In some instances, a region 47 of the broad sealing surface may be provided with a roughened surface for providing turbulent fluid flow resistance against hot exhaust gases. Additionally, it is seen that a lower surface 50 thereof defines a frustro-conical surface that limits twisting action of the seal, preventing breakage, and also limits reach or throw of leading edge 44 by virtue of surface 50 being in abutting relation with groove wall 38, providing a positive stop against the twisting motion of seal 30.

For providing a positive, initial seal, seal 30 may be provided with pre-twist when fabricated. The pre-twist may also be achieved by sizing the seals such that the diameter of inner sealing edge 36 (FIG. 2) is slightly smaller than the diameter of recessed wall 42 of groove 28. Thus, with seal 30 installed in groove 28, expansion forces are present on inner edge seal 36, pivoting seal 30 about sealing edge 34 and urging leading edge 44 outward. During booster assembly, beveled edge 70 (FIG. 1) of tongue 20 urges leading edge 44 of seal 30 toward guard 60, allowing tongue 20 to be inserted between clevis sections 16 and 18. This pre-twisted configuration has the advantage of excluding moisture and other contaminants from booster joint 14 and further allows pressure testing of the seals to the point where reverse pressure momentarily unseats the upper seal ring. This is done by replacing test plug 9 (FIG. 1) with an appropriate pressure fixture (not shown) and pressurizing interstitial region 32 between seals 30.

Figure 3:
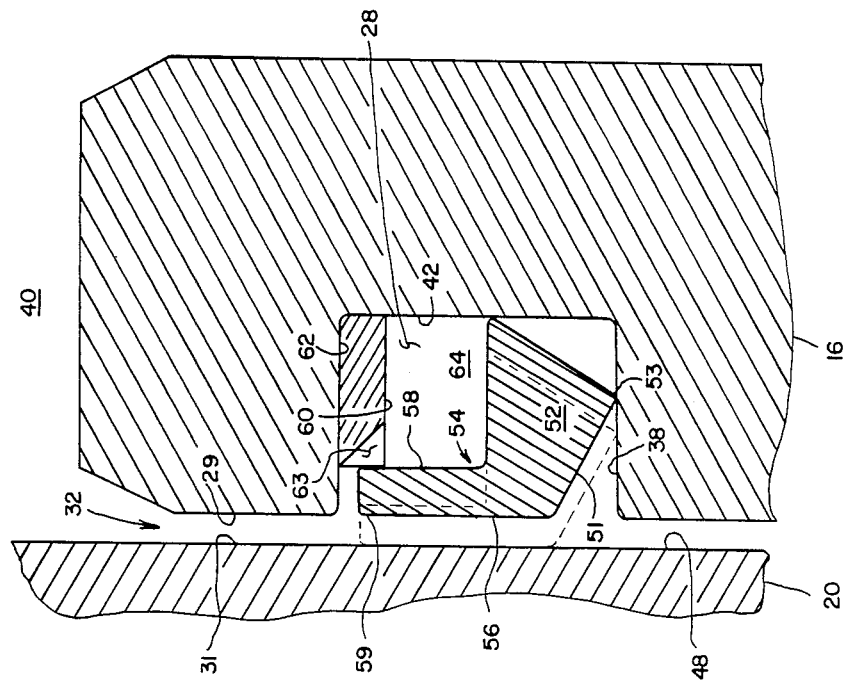
FIG. 3 is an enlarged sectional view of an alternate embodiment of the seal shown in FIG. 2.

As an alternate embodiment to the seal shown and described, FIG. 3 illustrates a similar seal 52 wherein an upper, inner region 54 of the seal is configured for fluid pressure to readily rotate and expand seal 52 outward until broad facing surface 56 is in sealing engagement with surface 48 of tongue 20 (dotted lines). This is accomplished by providing a surface 58 which extends upwardly generally parallel to tongue wall 48 and, after seal 52 is twisted by booster ignition about pivotal edge seal 53 and leading edge 59 is deployed against surface 48, is at an acute angle to inside surface 48 of tongue 20. Fluid pressure against inner surface 58 of seal 52 then causes the seal to twist in an opposite direction to the initial twist and forces the seal outward into its fully deployed position, with broad seal surface 56 against inner tongue surface 48. As described earlier in the seal of FIG. 2, a frustro-conical surface 51 provides a positive stop against twisting motion of seal 52 by providing a surface which abuts against groove wall 38.

Yet another alternate embodiment is shown in FIG. 7. In this embodiment, edge sealing regions 35, 37, 45, and broad sealing surface 49 are constructed of a deformable or malleable material, such as copper or rubber. This allows these edges and surfaces to be more conforming to abberations or irregularities in the groove or the adjacent surface than the above-described embodiments.

In the three described embodiments, a guard or stop 60 is disposed on an upper surface 62 of groove 28 adjacent the upper leading edge region of the seals. Guard 60 is provided with notches 63 to admit fluid pressure into a region 64 behind the seals and also serves to limit twisting motion of the seals to a direction which brings the leading edge into contact with inner surface 48 of tongue 20. This guard acts as a positive stop, preventing accidental inward twisting of the seals.

In instance where assembly considerations are paramount, seals 30 may be constructed as shown in FIG. 4. In this case, the seal is not provided with pre-twist and assumes a retracted position, with sealing edge 44 being spaced from inner surface 48 of tongue 20. In this instance, narrow sealing edge 34, opposed from a source of pressure 40 in interstitial region 32 of the booster motor, provides a pivotal edge about which the entire seal pivots, while inner edge seal 36 bears against recessed wall 42 of groove 28 and provides an edge against which expansion forces due to booster ignition are applied to the seal.

The rest position of the retracted seal is as shown in FIG. 4, with upper leading edge region 44 being retracted and the broad sealing surface 46 being approximately in a plane parallel with surface 48 of tongue 20. This at rest, retracted position of seal 30 allows easier assembly of booster segments 10 and 12 with less possibility of damage to the seals as they are in a non-interfering configuration when tongue 20 is inserted between clevis sections 16 and 18. As described earlier, a lower surface 50 of seal 30 defines a frustro-conical surface that acts as a positive stop against against groove wall 38, limiting twisting motion of the seal.

For providing a flange seal (FIGS. 5 and 6), a seal 80 having a 90° reoriented cross section with respect to axis 82 is constructed having the pre-twist built into the seal. In this design, and as shown in FIG. 6, the pre-twisted seal acts as a torsion spring between flange members 84 and 86 to establish deployed seals at leading edge 88 and edge seals 90 and 92. Upon pressurization of interstice 100 of the flange, seal 80 rotates and expands, bringing broad seal surface 96 into sealing engagement with adjacent flange surface 98.

During assembly, these seals are stretched, as by a tool or by heating, to facilitate their insertion into grooves 28. Upon ignition of the booster motor, segments 16 and 18 expand outward. As joint 14 expands (dotted lines in FIG. 2), the seal provided with pre-twist is forced outward by recessed groove wall 42, relaxing the pretwist by bringing broad sealing surface 46 into sealing engagement with surface 48 of tongue 20. In the case of the retracted seal shown in FIG. 4, when inner sealing edge 36 of seal 30 is forced outward, seal 30 twists about pivotal sealing edge 34, bringing leading edge seal 44 into sealing engagement with surface 48 of tongue 20, as shown in FIG. 2. This results in broad sealing surface 46 being at an acute angle to surface 48 of tongue 20. When this occurs, the combination of increasing fluid pressure behind the seal and heating of the seal causes leaning load on seal 30 to be increased to a point where pressure twists the seal in an opposite direction, driving the broad seal surface against surface 48 of tongue 20 (dotted lines in FIG. 4). At this point, the seal between recessed groove wall 42 and inner edge seal 36 is lost, but a seal is established between pivotal sealing edge 34 and groove wall 38. Of course, broad seal surface 46 seals across interstice 32 against surface 48 of tongue 20.

In the instance where a flange is to be sealed (FIGS. 5 and 6), the pre-twisted seal 80 is forced during assembly into the partially deployed position as shown in FIG. 6. Upon pressurization of interstice 94 of the flange, broad seal surface 96 of seal 80 is driven as described against the adjacent surface 98, sealing interstice 94.

From the foregoing, it is apparent that the applicant has provided a twist seal for sealing interstices between solid rocket segments against excursion of hot exhaust gases and which is easy to retrofit, will operate within a wide temperature range, and can be adapted to a variety of uses.

I claim:

1. A twist seal for sealing an interstitial region between a pair of adjacent members having first and second facing surfaces, said seal being disposed in a circular groove in said first facing surface, said groove having a side wall opposed from a pressurized region between said pair of members, and a recessed wall disposed in substantially normal relation with said side wall, said seal comprising:
   a leading sealing edge in sealing engagement with said second facing surface;
   a broad seal surface continuous with said leading sealing edge and generally facing said second facing surface;
   a first, pivotal edge seal in sealing engagement with said side wall; and
   a second edge seal in expansive engagement with said recessed wall for establishing a pre-twisted condition of said twist seal, whereby fluid pressure applied to a pressurized side of said seal effects twisting thereof, driving said broad seal surface into sealing engagement with said second facing surface.

2. A seal as set forth in claim 1 comprising stop means disposed in a side wall of said groove closest to said pressurized region between said members, for limiting motion of said leading sealing edge in a direction toward said second surface.

3. A seal as set forth in claim 2 wherein said leading sealing edge and said first pivotal edge seal and said second edge seal are constructed of a malleable material, allowing said leading sealing edge and said first pivotal edge seal and said second edge seal to be deformable.

4. A seal as set forth in claim 3 wherein said seal is an annular seal.

5. A twist seal for sealing against fluid pressure in an interstitial region between a pair of adjacent members having first and second facing surfaces, said seal being disposed in a groove in said first facing surface, said groove having a side wall opposed from a pressurized region between said adjacent members, and a recessed wall disposed in substantially normal relation with said side wall, said seal comprising:
   a leading sealing edge spaced from said second facing surface;
   a broad seal surface continuous with said leading sealing edge, said broad seal surface facing said second facing surface;
   a first, pivotal, sealing edge in sealing engagement with said side wall; and
   a second sealing edge in engagement with said recessed wall and disposed to receive expansion forces therefrom, whereby, as said second sealing edge is expanded, said seal twists and pivots about said first sealing edge, bringing said leading sealing edge into sealing engagement with said second facing surface, after which fluid pressure on a pressurized side of said seal forces said broad seal surface into sealing engagement with said second facing surface.

6. A seal as set forth in claim 5 comprising stop means disposed on a side wall of said groove closest to said pressurized region for limiting travel of said leading sealing edge to a direction toward said second facing surface.

7. A seal as set forth in claim 6 wherein said stop means is provided with openings therein for allowing passage of said fluid pressure therethrough.

8. A seal as set forth in claim 7 wherein said first and second sealing edges are provided with a generally narrow contact area, allowing said first and second sealing edges to deform to and seal local irregularities in said groove.

9. A seal as set forth in claim 8 wherein the seal is coated with a heat-resistant material, including asbestos, to increase operating temperature of said seal.

10. A seal as set forth in claim 9 wherein said seal is an annular seal.

11. A seal as set forth in claim 10 wherein said leading sealing edge and said first pivotal edge seal and said second edge seal are constructed of a malleable material, allowing said leading sealing edge and said first pivotal edge seal and said second edge seal to be deformable.

12. A twist seal for sealing an interstitial region between first and second adjacent members, said seal being disposed in a groove in said first member, said groove including a groove wall opposed from a source of pressure, a recessed groove wall in substantially normal relation with said groove wall opposed from a source of pressure, and an open side facing said interstitial region and said second adjacent member, said seal comprising:
   a leading sealing edge disposed for sealing across said interstitial region and against said second adjacent member;
   a broad sealing surface continuous with said leading sealing edge;
   a first pivotal edge seal in sealing engagement with said groove wall opposed from a source of pressure;
   a second edge seal in sealing engagement with said recessed groove wall and disposed for receiving expansion pressure therefrom, expanding said seal; and
   an inner wall generally normal to said second adjacent member and disposed to receive fluid pressure in said interstitial region, causing said seal to twist, urging said broad sealing surface into sealing engagement with said second adjacent member.

13. A seal as set forth in claim 12 comprising stop means disposed on a side wall of said groove closest to said pressurized region for limiting travel of said leading sealing edge to a direction toward said second facing surface.

14. A seal as set forth in claim 13 wherein said stop means is provided with openings therein for allowing passage of said fluid pressure therethrough.

15. A seal as set forth in claim 14 wherein a downstream region of said broad sealing surface is roughened, providing turbulent fluid flow resistance.

* * * * *